US012590566B2

(12) United States Patent
Hong et al.

(10) Patent No.: US 12,590,566 B2
(45) Date of Patent: Mar. 31, 2026

(54) OFFSHORE WIND POWER PLANT DESIGNED TO REDUCE FATIGUE LOAD OF WIND TURBINE

(71) Applicant: KOREA INSTITUTE OF OCEAN SCIENCE & TECHNOLOGY, Ansan-si (KR)

(72) Inventors: Key Yong Hong, Daejeon (KR); Kyong Hwan Kim, Daejeon (KR); Se Wan Park, Daejeon (KR); Kang Su Lee, Incheon (KR); Jong Su Choi, Daejeon (KR); Sang Lee, Daejeon (KR)

(73) Assignee: Korea Institute of Ocean Science & Technology, Busan (KR)

( * ) Notice: Subject to any disclaimer, the term of this patent is extended or adjusted under 35 U.S.C. 154(b) by 317 days.

(21) Appl. No.: 17/281,850

(22) PCT Filed: Jun. 19, 2019

(86) PCT No.: PCT/KR2019/007367
§ 371 (c)(1),
(2) Date: Mar. 31, 2021

(87) PCT Pub. No.: WO2020/071615
PCT Pub. Date: Apr. 9, 2020

(65) Prior Publication Data
US 2022/0018330 A1 Jan. 20, 2022

(30) Foreign Application Priority Data
Oct. 1, 2018 (KR) ........................ 10-2018-0116974

(51) Int. Cl.
*F03D 7/02* (2006.01)
*F03D 1/02* (2006.01)
(Continued)

(52) U.S. Cl.
CPC ............. *F03D 7/0204* (2013.01); *F03D 1/02* (2013.01); *F03D 7/0224* (2013.01); *F03D 7/048* (2013.01);
(Continued)

(58) Field of Classification Search
CPC ............ F05B 2240/37; F05B 2270/204; F05B 2240/95; F05B 2240/93; F05B 2240/96;
(Continued)

(56) References Cited

U.S. PATENT DOCUMENTS

| | | | |
|---|---|---|---|
| 2001/0002757 A1* | 6/2001 | Honda | ...................... F03D 1/02 290/55 |
| 2009/0185901 A1* | 7/2009 | Nielsen | ................. F03D 7/0296 416/31 |

(Continued)

FOREIGN PATENT DOCUMENTS

| | | |
|---|---|---|
| EP | 1106825 A2 | 6/2001 |
| EP | 2696067 A2 | 2/2014 |

(Continued)

OTHER PUBLICATIONS

Sang Lee et al. "Large-eddy simulation of offshore wind plants and fatigue load mitigation via pitch control strategies"; Journal of Renewable and Sustainable Energy 033304 (2018), p. 1-17, American Institute of Physics.

*Primary Examiner* — Christopher Verdier
(74) *Attorney, Agent, or Firm* — Knobbe, Martens, Olson & Bear, LLP

(57) ABSTRACT
An offshore wind power plant designed to reduce a fatigue load of a wind turbine includes an offshore structure, a plurality of wind turbines which is installed above the offshore structure to be spaced apart from each other with a predetermined distance and is supplied with a power through wind to produce electrical energy; and a turbine controller
(Continued)

which controls at least one of a pitch movement and a yaw movement for the plurality of wind turbines.

6 Claims, 12 Drawing Sheets

(51) Int. Cl.
| | |
|---|---|
| *F03D 7/04* | (2006.01) |
| *F03D 13/25* | (2016.01) |
| *F03D 80/00* | (2016.01) |

(52) U.S. Cl.
CPC ............ *F03D 13/25* (2016.05); *F03D 7/0202* (2023.08); *F03D 7/049* (2023.08); *F03D 13/256* (2023.08); *F03D 80/002* (2023.08); *F05B 2240/37* (2020.08); *F05B 2240/93* (2013.01); *F05B 2240/96* (2013.01); *F05B 2270/204* (2020.08)

(58) Field of Classification Search
CPC . F03D 7/049; F03D 7/048; F03D 1/02; F03D 7/0202; F03D 7/02; F03D 7/0204; F03D 1/181; F03D 7/0212; F03D 7/0224; F03D 7/024; F03D 13/25; F03D 13/256; F03D 17/008; F03D 80/002
See application file for complete search history.

(56) References Cited

U.S. PATENT DOCUMENTS

| | | | | |
|---|---|---|---|---|
| 2013/0207392 A1* | 8/2013 | McCorkendale | ....... | F03D 7/048 |
| | | | | 290/44 |
| 2014/0117668 A1* | 5/2014 | Jayant | .................... | F03D 7/048 |
| | | | | 290/44 |
| 2015/0050144 A1* | 2/2015 | Westergaard | ......... | F03D 7/0204 |
| | | | | 416/1 |
| 2015/0233356 A1* | 8/2015 | Lee | ......................... | F03D 7/048 |
| | | | | 290/55 |
| 2017/0241408 A1* | 8/2017 | Von Heland | ............ | B63B 35/44 |
| 2018/0238303 A1* | 8/2018 | De Boer | ................. | F03D 7/048 |

FOREIGN PATENT DOCUMENTS

| | | | |
|---|---|---|---|
| EP | 2910779 | A1 | 8/2015 |
| EP | 3306078 | A1 | 4/2018 |
| JP | 2001-165032 | A | 6/2001 |
| KR | 10-1458798 | B1 | 11/2004 |
| KR | 10-1302022 | B1 | 9/2013 |
| KR | 10-2013-0124028 | A | 11/2013 |
| KR | 10-1458786 | B1 | 11/2014 |
| KR | 10-1700749 | | 1/2017 |
| KR | 10-2018-0010745 | A | 1/2018 |

* cited by examiner

OFFSHORE WIND POWER PLANT DESIGNED TO REDUCE FATIGUE LOAD OF WIND TURBINE

TECHNICAL FIELD

The present invention relates to an offshore wind power plant, and more particularly to an offshore wind power plant designed to reduce a fatigue load of a wind turbine.

BACKGROUND ART

Generally, the offshore wind power plant rotates a rotor blade which is a rotor installed at a predetermined height from the ground using a kinetic energy of the wind and drives a generator installed in a wind power generator using a mechanical energy generated by the rotation of the rotor blade to generate electricity.

The offshore wind power plant has no concern for environmental pollution and huge potential of the energy resource thereof so that it is widely developed and used as a part of alternative energy sources in the countries around the world.

However, in the offshore wind power plant of the related art, if a plurality of wings is installed to be adjacent to each other, fatigue loads are applied to adjacent towers or wings due to the influence by wake between offshore wind power plants.

At this time, the wake of the offshore wind power plant influences on the rotation of the wing adjacent to the rear side to lower the wind power generation performance and increase the turbulence strength and the fatigue load, thereby lowering a structural safety of the equipment.

Accordingly, a technique for minimizing the influence of the wake between a plurality of wings installed to be adjacent and ensuring the structural stability of the tower is requested.

A related prior art is disclosed in Korean Registered Patent Publication No. 10-1302022 (entitled wind power generation system and controlling method of driving the same).

DISCLOSURE

Technical Problem

An exemplary embodiment of the present invention provides an offshore wind power plant which reduces a fatigue load of a turbine by pitch control or yaw control according to a displacement structure of a wind turbine disposed on an offshore structure and improves a lifespan.

Problems to be solved by the present invention are not limited to the above-mentioned problem(s), and other problem(s), which is (are) not mentioned above, can be clearly understood by those skilled in the art from the following descriptions.

Technical Solution

An offshore wind power plant designed to reduce a fatigue load of a wind turbine according to an exemplary embodiment of the present invention includes an offshore structure, a plurality of wind turbines which is installed above the offshore structure to be spaced apart from each other with a predetermined distance and is supplied with a power through wind to produce electrical energy; and a turbine controller which controls at least one of a pitch movement and a yaw movement for the plurality of wind turbines.

Further, according to one exemplary embodiment of the present invention, the plurality of wind turbines may include: a first wind turbine installed at a front side above the offshore structure; and a second wind turbine installed at a rear side of the first wind turbine.

Further, according to one exemplary embodiment of the present invention, the first wind turbine and the second wind turbine may be implemented by a plurality of wind turbines which is implemented to be spaced apart from each other in at least one of a traverse direction and a longitudinal direction.

Further, according to one exemplary embodiment of the present invention, the distance between the plurality of wind turbines may be implemented based on the following Equation 1:

$$1.5D <= \text{Distance between plurality of wind turbines} <= 7D \qquad \text{[Equation 1]}$$

Here, D refers to a diameter of a blade equipped in the plurality of wind turbines.

Further, according to one exemplary embodiment of the present invention, the distance between the plurality of wind turbines may be 1.5D.

Further, according to one exemplary embodiment of the present invention, the turbine controller may control a pitch angle of a blade equipped in the plurality of wind turbines by a predetermined angle.

Further, according to one exemplary embodiment of the present invention, the turbine controller may maintain a pitch angle of a blade equipped in the second wind turbine and control a pitch angle of a blade equipped in the first wind turbine by a predetermined angle.

Further, according to one exemplary embodiment of the present invention, the turbine controller may maintain a pitch angle of a blade equipped in the first wind turbine and control a pitch angle of a blade equipped in the second wind turbine by a predetermined angle.

Further, according to one exemplary embodiment of the present invention, the predetermined angle may be 3 degrees to 6 degrees.

Further, according to one exemplary embodiment of the present invention, the turbine controller may control a yaw angle of a nacelle equipped in the plurality of wind turbines.

Further, according to one exemplary embodiment of the present invention, the turbine controller may maintain a yaw angle of a nacelle equipped in the second wind turbine and control a yaw angle of a nacelle equipped in the first wind turbine by a predetermined angle.

Further, according to one exemplary embodiment of the present invention, the turbine controller may maintain a yaw angle of a nacelle equipped in the first wind turbine and control a yaw angle of a nacelle equipped in the second wind turbine by a predetermined angle.

Specific items of other embodiments are included in the detailed description and the drawings.

[Advantageous Effects]

According to exemplary embodiment of the present invention, the fatigue load of the turbine is reduced and the lifespan is improved by pitch control or yaw control according to a displacement structure of a wind turbine disposed on an offshore structure.

Further, according to exemplary embodiments of the present invention, pitch movement and yaw movement of each wind turbine disposed at a front side and a rear side on the offshore structure are independently controlled to reduce the fatigue load of the wind turbine while maintaining an overall power generation amount.

Figure 1:
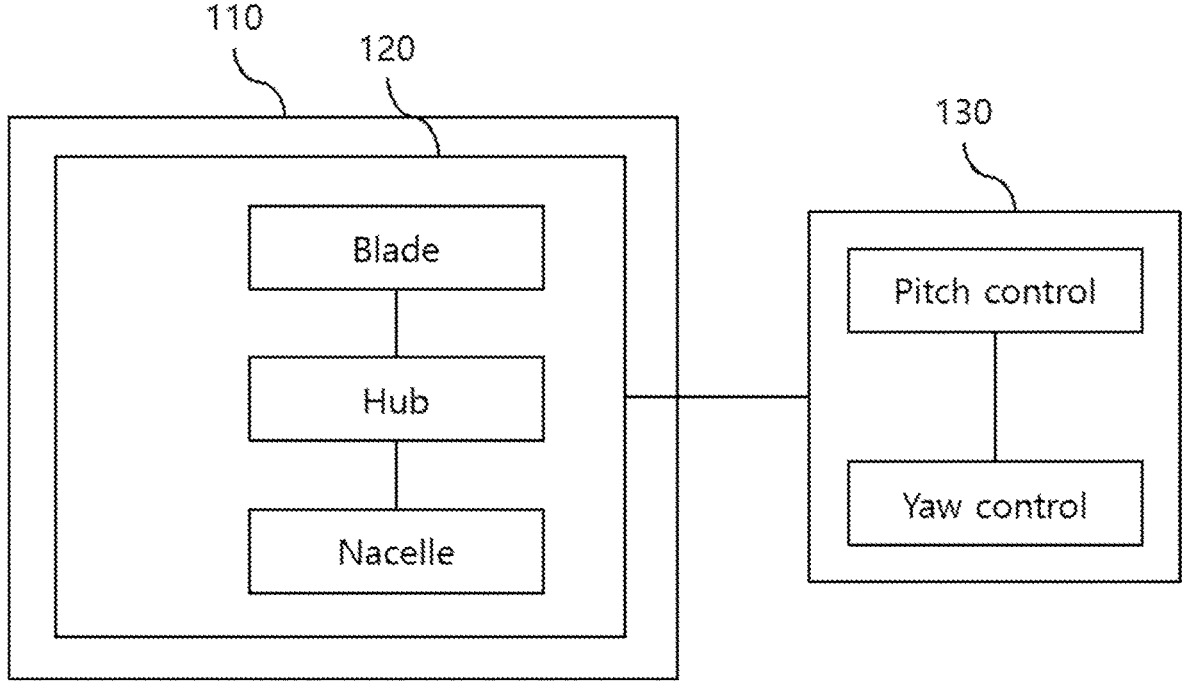
FIG. 1 is a block diagram illustrating to explain an offshore wind power plant for reducing a fatigue load of a wind turbine according to an exemplary embodiment of the present invention.

DESCRIPTION OF MAIN REFERENCE
NUMERALS OF DRAWINGS

110: Offshore structure
120: Plurality of wind turbine
122: First wind turbine
124: Second wind turbine
130: Turbine controller

BEST MODE

Advantages and/or characteristics of the present invention, and a method of achieving the advantages and characteristics will be clear by referring to exemplary embodiments described below in detail together with the accompanying drawings. However, the present invention is not limited to the following exemplary embodiments but may be implemented in various different forms. The exemplary embodiments are provided only to complete the disclosure of the present invention and to fully provide a person having ordinary skill in the art to which the present invention pertains with the category of the disclosure, and the present invention will be defined by the appended claims. Like reference numerals indicate like elements throughout the specification.

Hereinafter, exemplary embodiments of the present disclosure will be described in detail with reference to the accompanying drawings.

Figure 2:
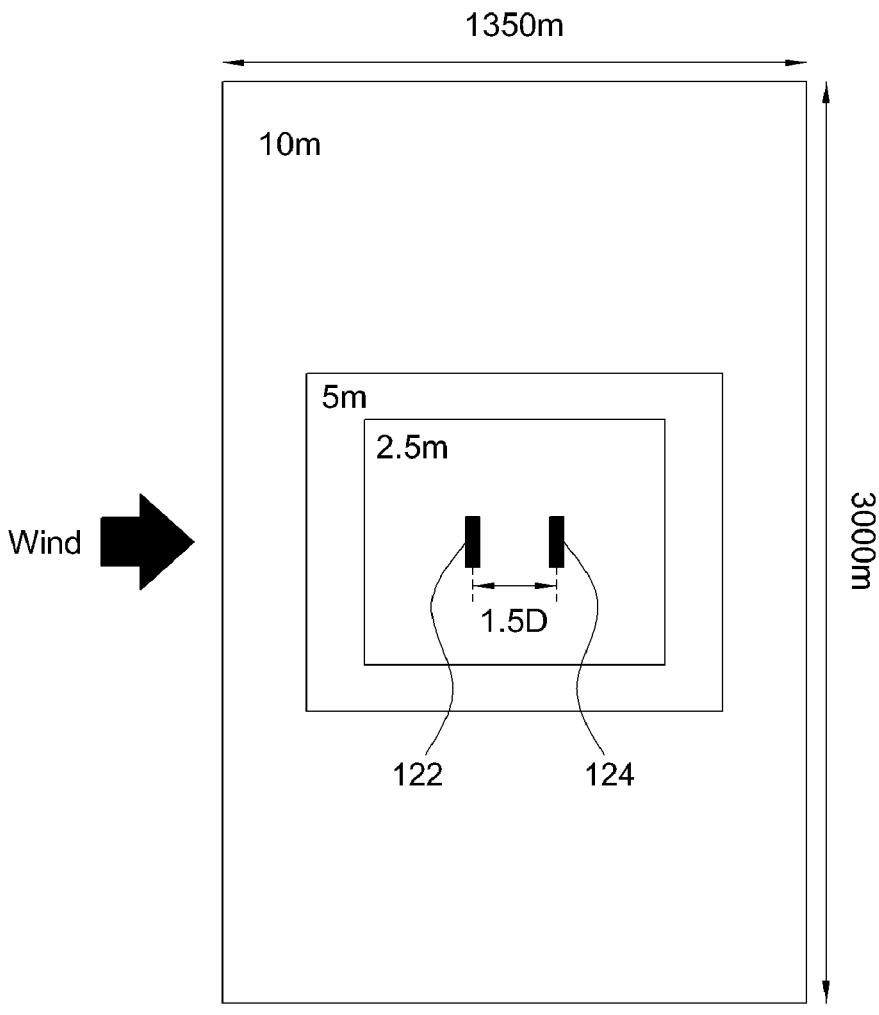
FIG. 2 is a view schematically illustrating an offshore wind power plant according to displacement of wind turbines, in an exemplary embodiment of the present invention.
Figure 3:
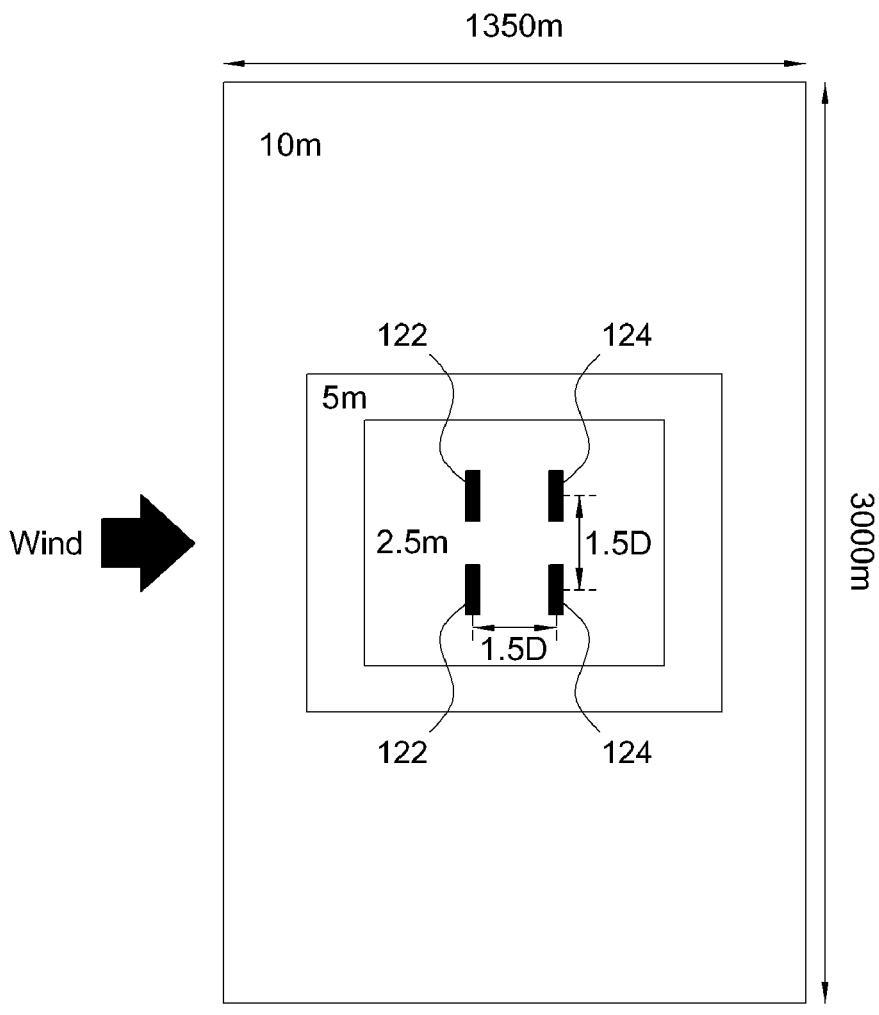
FIG. 3 is a view schematically illustrating a modified embodiment of an offshore wind power plant according to displacement of wind turbines, in an exemplary embodiment of the present invention.
Figure 4A:
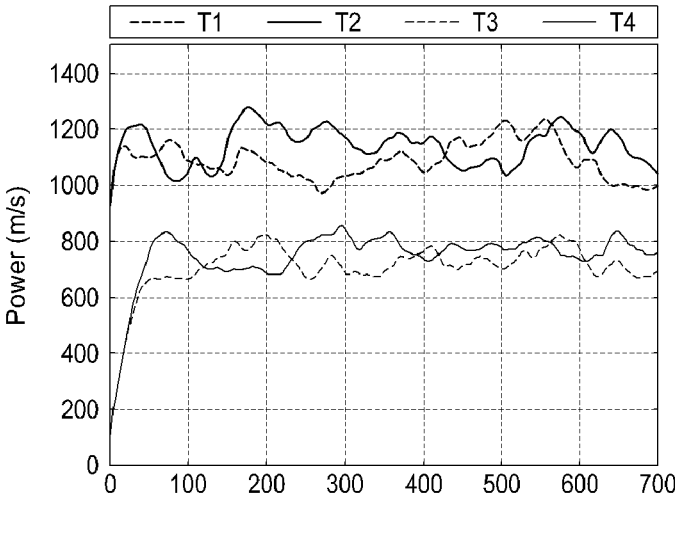
FIGS. 4A to 4D are graphs illustrating a power generation amount of a wind turbine in accordance with a change of a pitch angle when a blade pitch angle of a second wind turbine is maintained and a blade pitch angle of a first wind turbine is controlled, in an exemplary embodiment of the present invention.
Figure 4B:
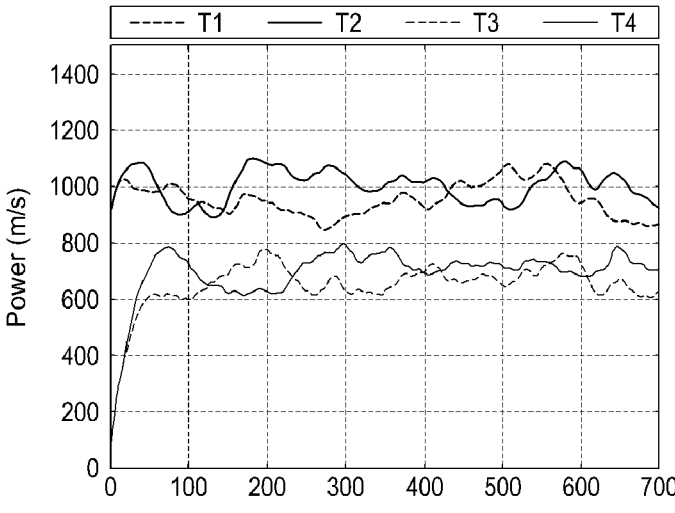
Figure 4C:
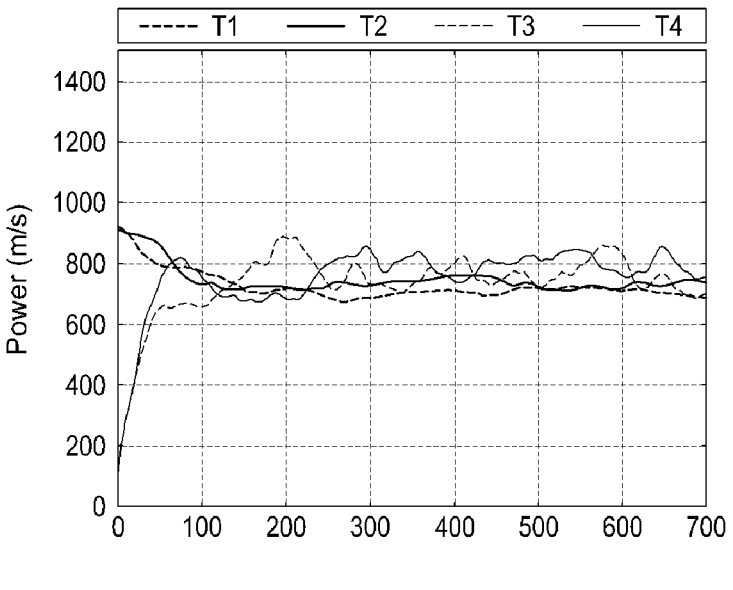
Figure 4D:
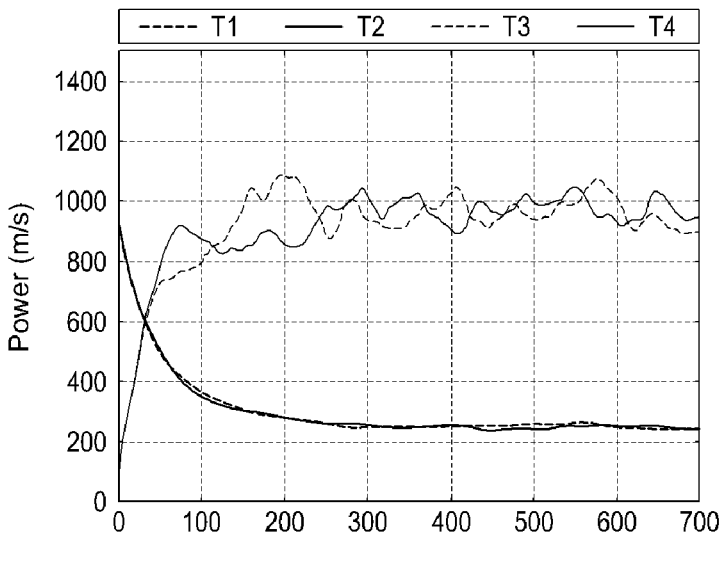
Figure 5A:
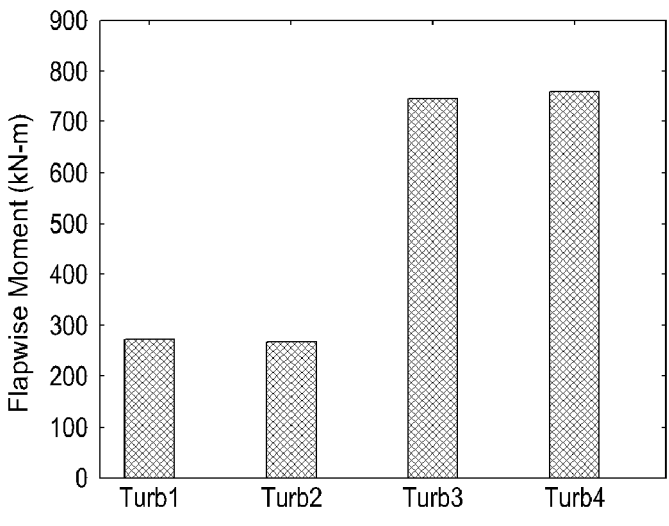
FIGS. 5A to 5D are graphs illustrating a fatigue load of a blade in accordance with a change of a pitch angle when a blade pitch angle of a second wind turbine is maintained and a blade pitch angle of a first wind turbine is controlled, in an exemplary embodiment of the present invention.
Figure 5B:
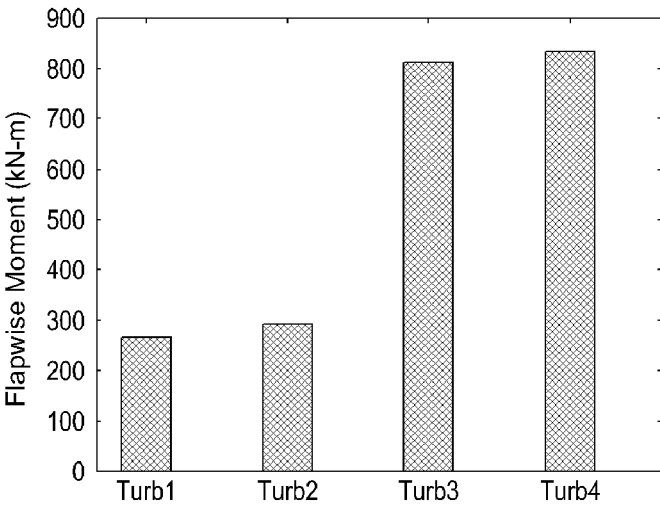
Figure 5C:
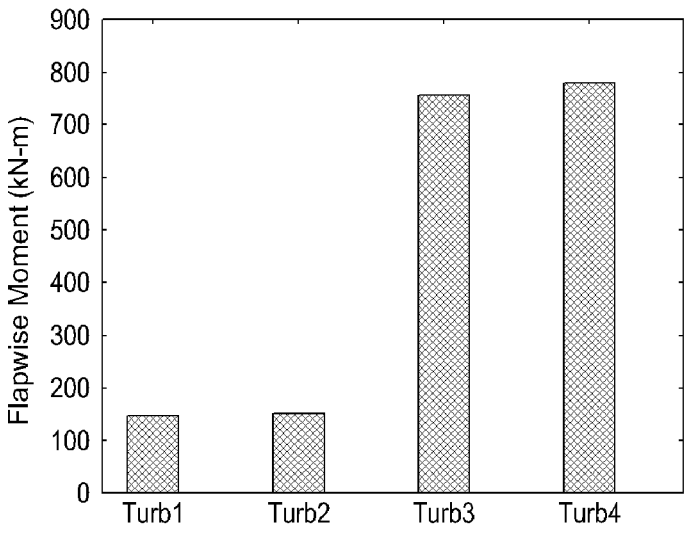
Figure 5D:
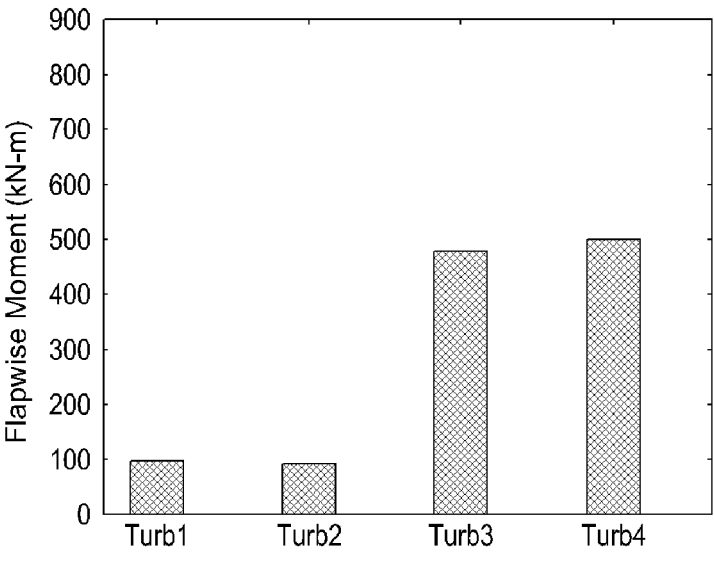

FIG. 1 is a block diagram illustrating to explain an offshore wind power plant for reducing a fatigue load of a wind turbine according to an exemplary embodiment of the present invention, FIG. 2 is a view schematically illustrating an offshore wind power plant according to displacement of wind turbines, in an exemplary embodiment of the present invention, and FIG. 3 is a view schematically illustrating a modified embodiment of an offshore wind power plant according to displacement of wind turbines, in an exemplary embodiment of the present invention.

Referring to FIG. 1, an offshore wind power plant for reducing a fatigue load of a wind turbine according to an exemplary embodiment of the present invention may include an offshore structure 110, a plurality of wind turbines 120, and a turbine controller 130.

The offshore structure 110 may be implemented as a rectangular plate formed as one stage or alternatively, may be implemented as a rectangular plate formed as two stages. When the offshore structure 110 is formed with two stages, a plate located on an upper stage may be rotatably controlled.

For reference, the offshore structure 110 may have a quadrangular frame shape, but may be manufactured to have various shapes such as a circle or a polygon as needed.

A plurality of support members may be installed on a lower portion to fix the offshore structure 110 onto a seabed and the offshore structure may be located at a height which is equal to or higher than the height of a sea level depending on the length of the plurality of support members.

Further, the offshore structure 110 may be implemented to float on a sea level without installing the plurality of support members on the lower portion.

The plurality of wind turbines 120 may be installed above the offshore structure 110 and in particular, may be implemented to be coupled to an upper portion of a wind tower installed on the offshore structure 110.

At this time, the plurality of wind turbines 120 may be installed on the upper portion of the offshore structure 110 to be spaced apart from each other with a predetermined distance and the spaced distance may be equal to each other.

The plurality of wind turbines 120 receives power supplied through the wind to produce electrical energy.

Specifically, the plurality of wind turbines 120 generates power in accordance with the rotation of the blade to produce electrical energy. That is, each wind turbine 120 may produce the electrical energy with power generated as the blade rotates by sea breeze.

The plurality of wind turbines 120 may include a first wind turbine installed at a front side above the offshore structure 110 and a second wind turbine installed at the rear side of the first wind turbine. That is, the first wind turbine and the second wind turbine may be installed to be disposed at the front side and the rear side on the offshore structure 110.

The turbine controller 130 may control at least one of a pitch movement and a yaw movement with respect to the plurality of wind turbines 120.

According to an exemplary embodiment, the turbine controller 130 may be equipped in a hub connected to the blade of the wind turbine 120 as a control device for controlling the pitch movement.

Here, the control device may include a sensor which senses a pitch angle of the blade and a driving motor which controls the blade in accordance with the pitch angle sensed by the sensor.

As an example, the turbine controller 130 may be equipped in a nacelle connected to the hub of the wind turbine 120 as a control device for controlling the yaw movement.

Here, the control device may include a sensor which senses a yaw angle of the nacelle and a driving motor which controls the nacelle in accordance with the yaw angle sensed by the sensor.

Generally, the wind turbines of the related art are disposed to be comparatively close to each other due to a limited size of the offshore structure and in particular, the wind turbines at the front side and the rear side are disposed to be parallel to each other in many cases. Accordingly, there may be a problem in that the wake generated from the wind turbines located at the front side is introduced in the wind turbines located at the rear side to reduce a power generation amount of the wind turbines located at the rear side. This may degrade the efficiency of the overall generation amount of the wind turbine and increase a fatigue load applied to the turbine.

Therefore, the present disclosure may propose a structure of a wind turbine for reducing a fatigue load in accordance with wake disturbance between wind turbines located at the front side and the rear side. Hereinafter, exemplary embodiments for a structure and control of the plurality of wind turbines to be proposed by the present invention will be described with reference to FIGS. 2 and 3.

Prior to description, in the above-described exemplary embodiments, an offshore wind power plant to be proposed was modeled to perform numerical analysis and simulation.

Specifically, in order to reproduce a planetary boundary layer with various surface roughnesses and a stability condition, large eddy simulation (LES) was applied.

A wind turbine used in the present invention had a capacity of 3 MW and included a hub with a height of 75.7 m and a diameter of 105 m as a horizontal axis turbine. A pitch angle and a yaw angle were fixed to 0 degree with respect to a neutral frame for the purpose of convenience and a transmission and a torque controller were activated.

A model of the wind turbine was configured by an actuator line coupled to FAST and the FAST analyzed a wind load based on aerodyne module after applying a local flow field to each blade element. A structural response and a position of the blade element were calculated using a structure module of the FAST. A time interval was limited so as not to be larger than a size of a lattice cell ($\Delta t$=0.01 s).

Specifically, in the present disclosure, an actuator line method was applied and an amplitude and a projection width of force generated at the actuator point were controlled using a Gaussian width applied by doubling a length of the lattice cell.

The incompressible Navier-Stokes equation using Coriolis force was calculated using SOWFA and the used SOWFA was a NREL LES code based on an OpenFOAM library. The calculated equation was separated using an unstructured collocated finite-volume formula.

A second order central difference technique and Rhie and Chow interpolation were used to prevent checkerboard pressure-velocity decoupling. Further, a pressure implicit splitting operation using three auxiliary correcting steps was used for time progression and the accuracy of the secondary time may be maintained by the usage of the auxiliary steps.

The aeroelasticity calculation in the FAST used a fourth order Adam-Bashforth predictor and Adam-Moultom correction time integration method.

Referring to FIGS. 2 and 3, the offshore structure is a platform with an area of 1360 m×3000 m and a height of 1000 m and is implemented to generate a plurality of lattice cells with a constant interval. At this time, each lattice cell may be generated in 10 m length in all major axes and a zone in the vicinity of the turbine may be generated in 2.5 m length.

A surface stress and a temperature flow conditions were applied to a surface boundary according to Moeng's method and a frictional speed was approximated according to Monin-Obhukov similarity theory. Inflow and outflow conditions were applied to left and right, respectively, and the outflow condition was applied such that advective flow was continuously introduced to an outlet calculation area.

For reference, the structure of the offshore structure is not limited to the above-described value and may be implemented with various values.

As an exemplary embodiment, as illustrated in FIG. 2, the plurality of wind turbines may include a first wind turbine 122 and a second wind turbine 124 which are installed to be spaced apart from each other at a front side and a rear side of the offshore structure with respect to a wind blowing direction.

Specifically, one first wind turbine 122 is installed at the front side of the offshore structure and one second wind turbine 124 is installed at the rear side of the offshore structure with a predetermined distance from the first wind turbine 122.

As another exemplary embodiment, as illustrated in FIG. 3, the plurality of wind turbines may include a plurality of first wind turbines 122 and a plurality of second wind turbines 124 which are implemented to form a matrix to be spaced apart from each other at a front side and a rear side of the offshore structure with respect to a wind blowing direction.

That is, the plurality of wind turbines may be implemented as a wind turbine group which is implemented to be spaced apart from each other in at least one direction of a traverse direction corresponding to a horizontal direction with respect to the drawings and a longitudinal direction corresponding to a vertical direction.

Specifically, two first wind turbines 122 may be installed at the front side of the offshore structure and two second wind turbines 124 may be installed at the rear side of the offshore structure with a predetermined distance from the first wind turbine 122. Accordingly, the first wind turbines 122 and the second wind turbines 124 may have a 2×2 matrix form.

At this time, the number of first wind turbines 122 and the number of second wind turbines 124 are not limited to two, but three or more wind turbines may be implemented.

For example, when the first wind turbines 122 and the second wind turbines 124 have a 3×4 matrix form, six wind turbines located at a front side are implemented as first wind turbines 122 and six wind turbines located at a rear side are implemented as second wind turbines 124.

The distance between the plurality of wind turbines 122 and 124 may be implemented based on the following Equation 1:

$$1.5D <= \text{Distance between plurality of wind turbines} <= 7D \qquad \text{[Equation 1]}$$

Here, D refers to a diameter of a blade equipped in the plurality of wind turbines 122 and 124.

In the present exemplary embodiment, the distance between the plurality of wind turbines 122 and 124 is within 2D, and desirably, is 1.5D.

For reference, the distance between the plurality of wind turbines 122 and 124 may include a distance between the first wind turbines 122 and a distance between the second wind turbines 124, and further includes a distance between the first wind turbine 122 and the second wind turbine 124.

The turbine controller may control a pitch angle of the blades equipped in the plurality of wind turbines 122 and 124 by a predetermined angle.

As an example, the turbine controller may maintain the pitch angle of the blade equipped in the second wind turbine 124 and control the pitch angle of the blade equipped in the first wind turbines 122 by a predetermined angle.

That is, only the pitch angle of the blade equipped in the first wind turbine 122, among the plurality of wind turbines 122 and 124, may be controlled by a predetermined angle. In this case, the pitch angle of the blade equipped in the first wind turbine 122 is controlled to reduce a turbulent flow and reduce a fatigue load applied to the second wind turbine 124.

As another example, the turbine controller may maintain the pitch angle of the blade equipped in the first wind turbine 122 and control the pitch angle of the blade equipped in the second wind turbines 124 by a predetermined angle.

That is, only the pitch angle of the blade equipped in the second wind turbine 124, among the plurality of wind turbines 122 and 124, may be controlled by a predetermined angle. In this case, even though a power generation amount of the second wind turbine 124 is reduced, a damage load applied to the blade of the second wind turbine 124 is smaller than a damage load applied to the blade of the first wind turbine 122 so that a lifespan of the entire turbines may be extended.

As described above, a wind turbine installed at the front side or a wind turbine installed at the rear side, among the plurality of wind turbines installed at the front side and the rear side on the offshore structure, are forcibly controlled to reduce the fatigue load applied to the wind turbine.

In the meantime, a pitch angle of the blade controlled by the turbine controller may be 3 degrees to 6 degrees, and in the present exemplary embodiment, desirably 4 degrees to 5 degrees.

For reference, the pitch angle of the blade refers to an angle at which the blade is bent toward the front side to be inclined and as an initial mode, the blade is inclined at a predetermined angle and the pitch angle of the blade may be controlled based on the inclined angle.

The turbine controller may control a yaw angle of the nacelles equipped in the plurality of wind turbines 122 and 124 by a predetermined angle.

As an example, the turbine controller may maintain the yaw angle of the nacelle equipped in the second wind turbine 124 and control the yaw angle of the nacelle equipped in the first wind turbines 122 by a predetermined angle.

That is, only the yaw angle of the nacelle equipped in the first wind turbine 122, among the plurality of wind turbines 122 and 124, may be controlled by a predetermined angle.

As another example, the turbine controller may maintain the yaw angle of the nacelle equipped in the first wind turbine 122 and control the yaw angle of the nacelle equipped in the second wind turbines 124 by a predetermined angle.

That is, only the yaw angle of the nacelle equipped in the second wind turbine 124, among the plurality of wind turbines 122 and 124, may be controlled by a predetermined angle.

By doing this, according to exemplary embodiments of the present invention, pitch movement and yaw movement of each wind turbine disposed at a front side and a rear side on the offshore structure are independently controlled to reduce the fatigue load of the wind turbine while maintaining an overall power generation amount.

For reference, FIGS. 2 and 3 schematically illustrate an offshore wind power plant of the present invention but omit the illustration of the turbine controller and for a description thereof, reference may be made to the above description of FIG. 1.

FIGS. 4A to 4D are graphs illustrating a power generation amount of a wind turbine in accordance with a change of a pitch angle when a blade pitch angle of a second wind turbine is maintained and a blade pitch angle of a first wind turbine is controlled, in an exemplary embodiment of the present invention and FIGS. 5A to 5D are graphs illustrating a fatigue load of a blade in accordance with a change of a pitch angle when a blade pitch angle of a second wind turbine is maintained and a blade pitch angle of a first wind turbine is controlled, in an exemplary embodiment of the present invention.

Referring to FIGS. 4A to 4D, it is confirmed that when the pitch angle of the blade equipped in the second wind turbine disposed at the rear side on the offshore structure is maintained and the pitch angle of the blade equipped in the first wind turbine disposed at the front side on the offshore structure is controlled to be inclined by 0 degree, 4 degrees, 5 degrees, and 6 degrees, as the pitch angle is gradually increased, the power generation amount of the first wind turbine is significantly reduced, but the power generation amount of the second wind turbine is increased.

Referring to FIGS. 5A to 5D, when the pitch angle of the blade equipped in the second wind turbine disposed at the rear side on the offshore structure is maintained and the pitch angle of the blade equipped in the first wind turbine disposed at the front side on the offshore structure is controlled to be inclined by 0 degree, 4 degrees, 5 degrees, and 6 degrees, as the pitch angle is gradually increased, the fatigue load of the blade equipped in the second wind turbine is partially reduced, and specifically, when the pitch angle is 6 degrees, the fatigue load is significantly reduced.

By doing this, according to the exemplary embodiments of the present invention, the pitch angle of the blade equipped in the first wind turbine is controlled to reduce a turbulent flow and reduce a fatigue load applied to the second wind turbine.

For reference, in FIGS. 4A to 4D, T1 and T2 denote power generation amounts of the first wind turbine and T3 and T4 denote power generation amounts of the second wind turbine. Further, in FIGS. 5A to 5D, Turb1 and Turb2 denote fatigue loads of the blade equipped in the first wind turbine and T3 and T4 denote fatigue loads of the blade equipped in the second wind turbine.

Figure 6A:
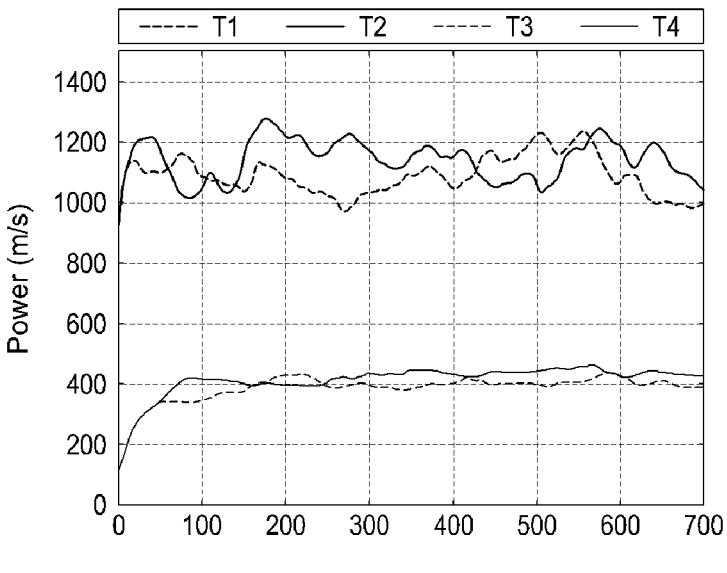
FIGS. 6A to 6C are graphs illustrating a power generation amount of a wind turbine in accordance with a change of a pitch angle when a blade pitch angle of a first wind turbine is maintained and a blade pitch angle of a second wind turbine is controlled, in an exemplary embodiment of the present invention.
Figure 6B:
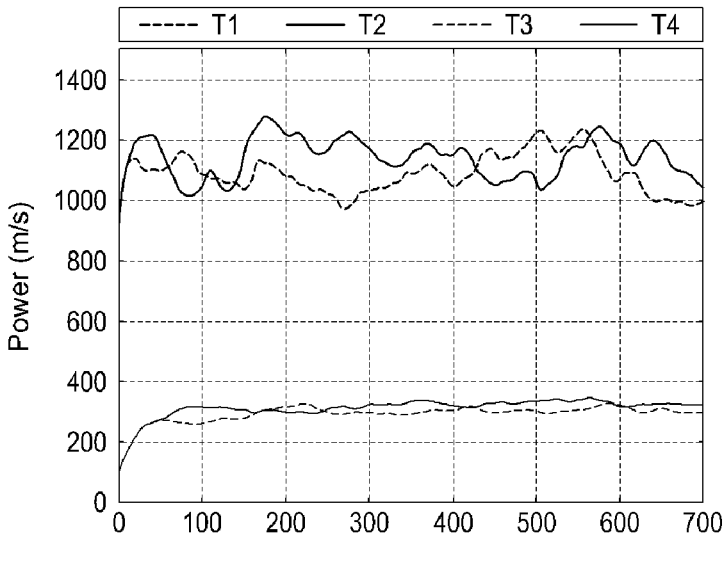
Figure 6C:
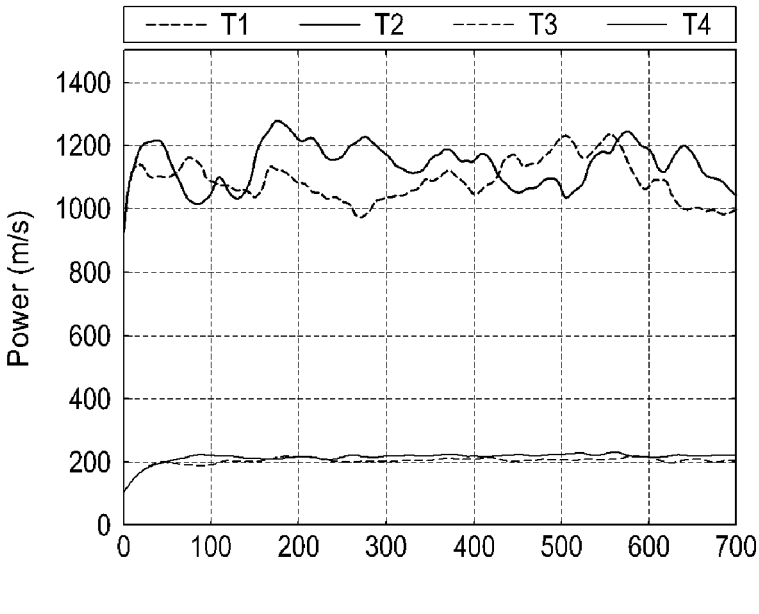
Figure 7A:
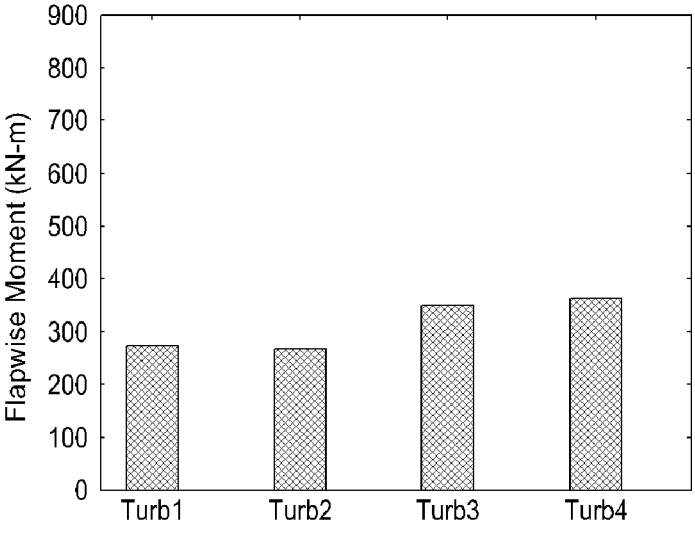
FIGS. 7A to 7C are graphs illustrating a fatigue load of a blade in accordance with a change of a pitch angle when a blade pitch angle of a first wind turbine is maintained and a blade pitch angle of a second wind turbine is controlled, under a wind speed of 8 m/s.
Figure 7B:
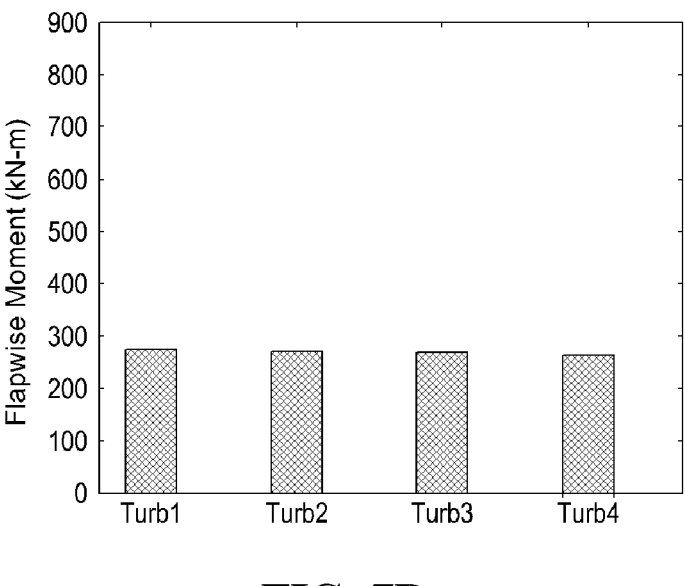
Figure 7C:
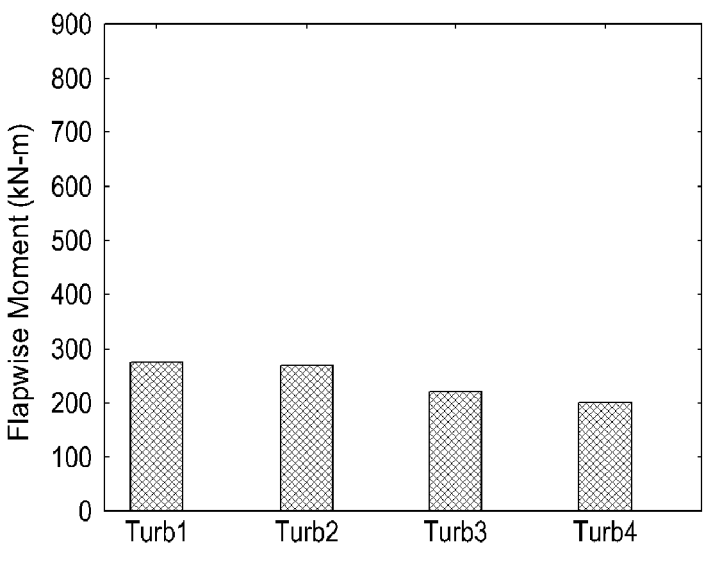
Figure 8A:
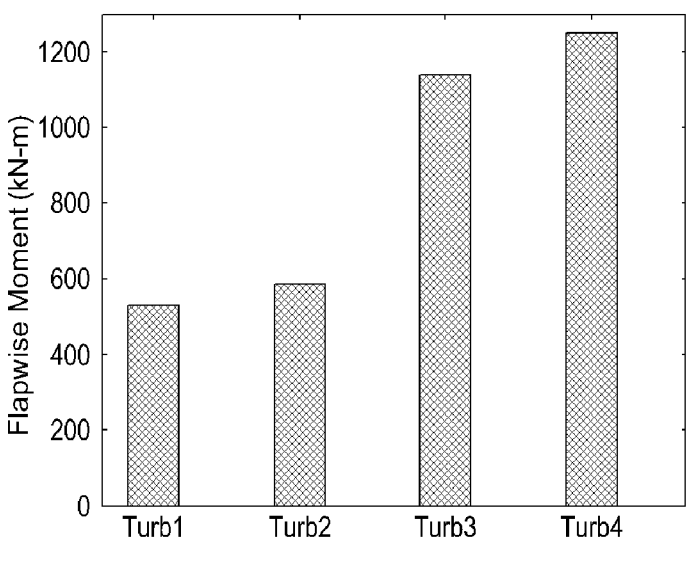
FIGS. 8A to 8C are graphs illustrating a fatigue load of a blade in accordance with a change of a pitch angle when a blade pitch angle of a first wind turbine is maintained and a blade pitch angle of a second wind turbine is controlled, under a wind speed of 11.7 m/s, in an exemplary embodiment of the present invention.
Figure 8B:
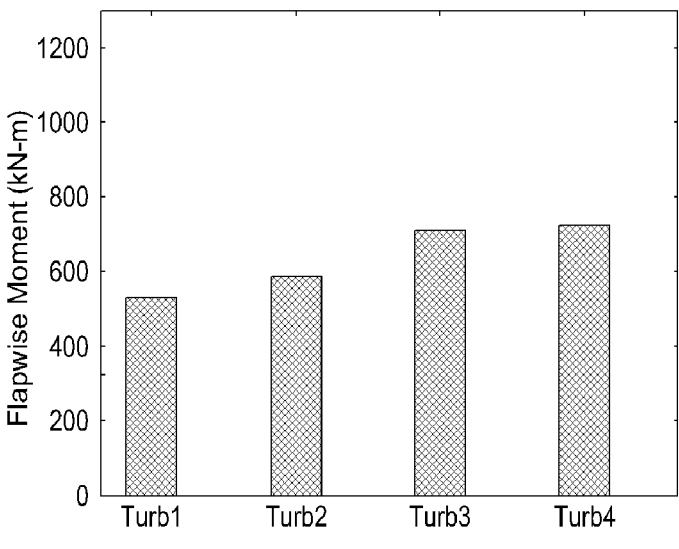
Figure 8C:
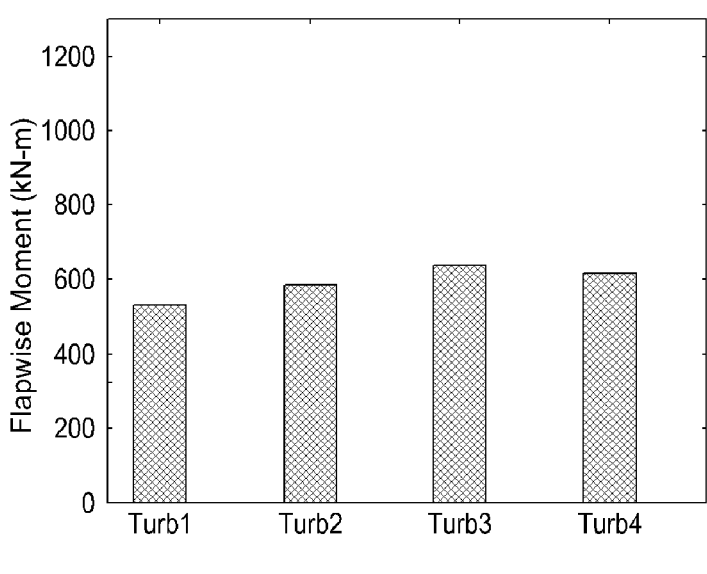

FIGS. 6A to 6C are graphs illustrating a power generation amount of a wind turbine in accordance with a change of a pitch angle when a blade pitch angle of a first wind turbine is maintained and a blade pitch angle of a second wind turbine is controlled, in an exemplary embodiment of the present invention, FIGS. 7A to 7C are graphs illustrating a fatigue load of a blade in accordance with a change of a pitch angle when a blade pitch angle of a first wind turbine is maintained and a blade pitch angle of a second wind turbine is controlled, under a wind speed of 8 m/s, in an exemplary embodiment of the present invention, and FIGS. 8A to 8C are graphs illustrating a fatigue load of a blade in accordance with a change of a pitch angle when a blade pitch angle of a first wind turbine is maintained and a blade pitch angle of a second wind turbine is controlled, under a wind speed of 11.7 m/s, in an exemplary embodiment of the present invention.

Referring to FIGS. 6A to 6C, it is confirmed that when the pitch angle of the blade equipped in the first wind turbine disposed at the front side on the offshore structure is maintained and the pitch angle of the blade equipped in the second wind turbine disposed at the rear side on the offshore structure is controlled to be inclined by 4 degrees, 5 degrees, and 6 degrees, the power generation amount of the second wind turbine is reduced, but the power generation amount of the first wind turbine which occupies the most of the power generation amount is maintained so that the overall power generation amount is maintained.

Referring to FIGS. 7A to 7C, when the pitch angle of the blade equipped in the first wind turbine disposed at the front side on the offshore structure is maintained and the pitch angle of the blade equipped in the second wind turbine disposed at the rear side on the offshore structure is controlled to be inclined by 4 degrees, 5 degrees, and 6 degrees, under the wind speed condition of 8 m/s, as the pitch angle is gradually increased, the fatigue load of the blade equipped in the second wind turbine is reduced, and specifically, when the pitch angle is 5 degrees, is the same as the fatigue load of the blade equipped in the first wind turbine.

Referring to FIGS. 8A to 8C, it is confirmed that when the pitch angle of the blade equipped in the first wind turbine disposed at the front side on the offshore structure is maintained and the pitch angle of the blade equipped in the second wind turbine disposed at the rear side on the offshore structure is controlled to be inclined by 4 degrees, 5 degrees, and 6 degrees, under the wind speed condition of 11.7 m/s, as the pitch angle is gradually increased, the fatigue load of the blade equipped in the second wind turbine is significantly reduced.

Accordingly, according to the exemplary embodiments of the present invention, even though the power generation amount of the second wind turbine is reduced, the damage load applied to the blade of the second wind turbine is smaller than the damage load applied to the blade of the first wind turbine so that the lifespan of the entire turbines may be extended.

For reference, in FIGS. 6A to 6C, T1 and T2 denote power generation amounts of the first wind turbine and T3 and T4 denote power generation amounts of the second wind turbine. Further, in FIGS. 7A to 7C, Turb1 and Turb2 denote fatigue loads of the blade equipped in the first wind turbine and T3 and T4 denote fatigue loads of the blade equipped in the second wind turbine.

Although a specific exemplary embodiment of the present disclosure has been described, it should be understood that various modifications may be made therein without departing from the scope of the present disclosure. Therefore, the scope of the present disclosure should not be limited to the described embodiment, but should be determined by the claims to be described below and equivalents thereof.

As described above, although the present disclosure has been described by limited embodiments and drawings, the present disclosure is not limited to the embodiments, and it will be apparent to those skilled in the art to which the present disclosure pertains that various modifications and variations may be made from the description. Therefore, the spirit of the present disclosure needs to be interpreted by the appended claims and all equivalent modifications are included within the spirit of the present disclosure.

The invention claimed is:

1. An offshore wind power plant designed to reduce a fatigue load of a wind turbine, comprising:
   an offshore structure comprising a first stage and a second stage configured to rotate with respect to the first stage,
   a plurality of wind turbines installed above the second stage of the offshore structure to be spaced apart from each other with a predetermined distance and configured to produce electrical energy based on wind power; and
   a turbine controller configured to control a pitch movement of at least one blade of each of the plurality of wind turbines,
   wherein the plurality of wind turbines include:
      a first wind turbine installed at a front side above the offshore structure; and
      a second wind turbine installed at a rear side of the first wind turbine, and
   wherein the turbine controller is configured to independently control a blade pitch angle of the first wind turbine and a blade pitch angle of the second wind turbine to operate the first wind turbine and the second wind turbine in a first operation mode and a second operation mode,
   wherein, in the first operation mode, the turbine controller is configured to:
      maintain the blade pitch angle of the second wind turbine, and
      adjust the blade pitch angle of the first wind turbine to be inclined by a first predetermined angle,
   wherein, in the second operation mode, the turbine controller is configured to:
      maintain the blade pitch angle of the first wind turbine, and
      adjust the blade pitch angle of the second wind turbine to be inclined by a second predetermined angle,
   wherein each of the first and second predetermined angles is in a range of 3 degrees to 6 degrees, and
   wherein the plurality of wind turbines are spaced apart from each other in at least one of a traverse direction or a longitudinal direction.

2. The offshore wind power plant of claim 1, wherein the predetermined distance between the plurality of wind turbines is implemented based on the following Equation 1:

$$1.5D <= \text{Distance between plurality of wind turbines} <= 7D \qquad \text{[Equation 1]}$$

wherein D refers to a diameter of a blade equipped in the plurality of wind turbines.

3. The offshore wind power plant of claim 2, wherein the predetermined distance between the plurality of wind turbines is 1.5D.

4. The offshore wind power plant of claim 1, wherein the turbine controller is configured to control a yaw angle of a nacelle equipped in the plurality of wind turbines.

5. The offshore wind power plant of claim 4, wherein, in the first operation mode, the turbine controller is configured to maintain a yaw angle of a nacelle equipped in the second wind turbine and adjust a yaw angle of a nacelle equipped in the first wind turbine to be inclined by a predetermined angle.

6. The offshore wind power plant of claim 4, wherein, in the second operation mode, the turbine controller is configured to maintain a yaw angle of a nacelle equipped in the first wind turbine and adjust a yaw angle of a nacelle equipped in the second wind turbine to be inclined by a predetermined angle.

* * * * *